United States Patent
Myeong et al.

(10) Patent No.: US 7,826,926 B2
(45) Date of Patent: Nov. 2, 2010

(54) ROBOT AND METHOD OF LOCALIZING THE SAME

(75) Inventors: Hyeon Myeong, Yongin-si (KR); Yong-beom Lee, Yongin-si (KR); Hyoung-ki Lee, Yongin-si (KR); Ki-wan Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 673 days.

(21) Appl. No.: 11/593,592

(22) Filed: Nov. 7, 2006

(65) Prior Publication Data

US 2007/0106423 A1 May 10, 2007

(30) Foreign Application Priority Data

Nov. 7, 2005 (KR) .................... 10-2005-0106088

(51) Int. Cl.
*G06F 19/00* (2006.01)
(52) U.S. Cl. .................... 700/245; 318/568.12
(58) Field of Classification Search ........... 700/245; 318/568.12
See application file for complete search history.

(56) References Cited

U.S. PATENT DOCUMENTS

| | | | |
|---|---|---|---|
| 5,684,696 A * | 11/1997 | Rao et al. ............ | 701/25 |
| 6,667,592 B2 | 12/2003 | Jacobs et al. | |
| 2003/0030399 A1 * | 2/2003 | Jacobs ............ | 318/568.16 |
| 2004/0158354 A1 * | 8/2004 | Lee et al. ............ | 700/245 |

FOREIGN PATENT DOCUMENTS

| | | |
|---|---|---|
| JP | 2001-264106 | 9/2001 |
| KR | 10-2004-0040155 | 5/2004 |
| KR | 10-0564236 | 3/2006 |
| WO | 2004/008648 | 1/2004 |

OTHER PUBLICATIONS

Chung et al., Sensor fusion for mobile robot dead-reckoning with precision-calibrated fiber optic gyroscope, May 2001, IEEE, pp. 3588-3593.*
Lee et al., Localization of a mobile robot using the image of a moving object, Jun. 2003, IEEE, vol. 50, No. 3, pp. 612-619.*
Kim et al., Evolutionary programming techniques for constrained optimization problems, Jul. 1997, IEEE, vol. 1, No. 2, pp. 129-140.*

(Continued)

*Primary Examiner*—Khoi Tran
*Assistant Examiner*—Jaime Figueroa
(74) *Attorney, Agent, or Firm*—Staas & Halsey LLP (57) ABSTRACT

A mobile robot and a method of localizing the robot are disclosed. The robot includes a gyroscope module providing information regarding a rotational angle of a gyroscope; an encoder module providing information regarding velocity and information regarding a rotational angle of a wheel of the robot by sensing motion of the wheel; and a control module estimating a current pose of the robot according to a method based on information provided by the encoder module and the gyroscope module, the control module incorporating information regarding rotational angle provided by the gyroscope module when estimating the current pose.

15 Claims, 10 Drawing Sheets

OTHER PUBLICATIONS

Welch et al., An introduction to the Kalman filter, 2001, University of North Carolina, Course 8, 81 pages.*

Spletzer, The extended Kalman filter, Apr. 2005, CSE398/498, cse.lehigh.edu, 29 pages.*

Rudolph Van Der Merwe, Sigma point Kalman filters for probabilistic inference in dynamic state-space models, Apr. 2004, OGI school of science & engineering at Oregon health & science university, pp. 1-397.*

Youcef et al., Robust position estimation of an autonomous mobile robot, Oct. 2008, Frontiers in automation and control, 26 pages.*

Korean Office Action issued on Sep. 25, 2006 with respect to Korean Application No. 10-2005-0106088, which corresponds to the above-referenced application.

Chung et al. "Accurate Mobile Robot Dead-Reckoning with a Precision-Calibrated Fiber-Optic Gyroscope" IEEE Transactions on Robotics and Automation, vol. 17, No. 1, Feb. 2001 pp. 80-84.

Myung et al. "Mobile Robot Localization with a Gyroscope and Constrained Kalman Filter" Samsung Tech. Conference; 12 pages.

Jin et al. "Position Estimation of Autonomous Mobile Robot Using Geometric Information of a Moving Object" Fuzzy Intelligent system symposium Papers 2004, vol. 14, No. 4, pp. 438-444.

* cited by examiner

$$
\begin{bmatrix} \delta X(k+1) \\ \delta Y(k+1) \\ \delta \psi(k+1) \\ S_R(k+1) \\ S_L(k+1) \\ \delta D(k+1) \\ \delta \phi(k+1) \\ \delta B_s(k+1) \\ \delta B_{rb}(k+1) \end{bmatrix} = \begin{bmatrix} 1 & 0 & -\sin\psi(k)\frac{U_R+U_L}{2} & \cos\psi(k)\frac{U_R}{2} & \cos\psi(k)\frac{U_L}{2} & 0 & 0 & 0 & 0 \\ 0 & 1 & \cos\psi(k)\frac{U_R+U_L}{2} & \sin\psi(k)\frac{U_R}{2} & \sin\psi(k)\frac{U_L}{2} & 0 & 0 & 0 & 0 \\ 0 & 0 & 1 & \frac{U_R}{D} & \frac{U_L}{D} & \frac{U_L-U_R}{D^2} & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & \Omega & 1 \\ 0 & 0 & 0 & 0 & 0 & 0 & 0 & 1 & 0 \\ 0 & 0 & 0 & 0 & 0 & 0 & 0 & 0 & 1 \end{bmatrix} \begin{bmatrix} \delta X(k) \\ \delta Y(k) \\ \delta \psi(k) \\ S_R(k) \\ S_L(k) \\ \delta D(k) \\ \delta \phi(k) \\ \delta B_s(k) \\ \delta B_{rb}(k) \end{bmatrix} + w
$$

FIG. 4

$$\begin{bmatrix} \delta X(k+1) \\ \delta Y(k+1) \\ \delta X_G(k+1) \\ \delta Y_G(k+1) \\ \delta \psi(k+1) \\ S_R(k+1) \\ S_L(k+1) \\ \delta D(k+1) \\ \delta \phi(k+1) \\ \delta B_S(k+1) \\ \delta B_{rb}(k+1) \end{bmatrix} = \overbrace{\begin{bmatrix} 1 & 0 & 0 & 0 & -\sin\psi(k)\frac{U_R+U_L}{2} & \cos\psi(k)\frac{U_R}{2} & \cos\psi(k)\frac{U_L}{2} & 0 & 0 & 0 & 0 \\ 0 & 1 & 0 & 0 & \cos\psi(k)\frac{U_R+U_L}{2} & \sin\psi(k)\frac{U_R}{2} & \sin\psi(k)\frac{U_L}{2} & 0 & 0 & 0 & 0 \\ 0 & 0 & 1 & 0 & -\sin\phi(k)\frac{U_R+U_L}{2} & \cos\phi(k)\frac{U_R}{2} & \cos\phi(k)\frac{U_L}{2} & 0 & 0 & 0 & 0 \\ 0 & 0 & 0 & 1 & \cos\phi(k)\frac{U_R+U_L}{2} & \sin\phi(k)\frac{U_R}{2} & \sin\phi(k)\frac{U_L}{2} & 0 & 0 & 0 & 0 \\ 0 & 0 & 0 & 0 & 1 & \frac{U_R}{D} & \frac{U_L}{D} & \frac{U_L-U_R}{D^2} & 0 & 0 & 0 \\ 0 & 0 & 0 & 0 & 0 & 1 & 0 & 0 & 0 & 0 & 0 \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & \Omega & 1 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{bmatrix}}^{F} \begin{bmatrix} \delta X(k) \\ \delta Y(k) \\ \delta X_G(k) \\ \delta Y_G(k) \\ \delta \psi(k) \\ S_R(k) \\ S_L(k) \\ \delta D(k) \\ \delta \phi(k) \\ \delta B_S(k) \\ \delta B_{rb}(k) \end{bmatrix} + w$$

$$Z = \hat{\psi}(k) - \hat{\phi}(k) + v = \delta\psi(k) - \delta\phi(k) + v$$

$$= \begin{bmatrix} 0 & 0 & 1 & 0 & 0 & 0 & -1 & 0 & 0 \end{bmatrix} \begin{bmatrix} \delta X(k) \\ \delta Y(k) \\ \delta \psi(k) \\ S_R(k) \\ S_L(k) \\ \delta D(k) \\ \delta \phi(k) \\ \delta B_S(k) \\ \delta B_{rb}(k) \end{bmatrix} + v$$

ROBOT AND METHOD OF LOCALIZING THE SAME

CROSS-REFERENCE TO RELATED APPLICATIONS

This application claims the benefit of Korean Patent Application No. 10-2005-0106088 filed on Nov. 7, 2005, in the Korean Intellectual Property Office, the disclosure of which is incorporated herein by reference in its entirety.

BACKGROUND OF THE INVENTION

1. Field of the Invention

The present invention relates to a method of localizing a robot. More particularly, the present invention relates to a method of localizing a mobile robot by using a Kalman filter with constrains as well as to a robot adapted to localize itself using this method.

2. Description of the Related Art

Various types of robots have recently appeared as a result of technological advancement. Particularly, there are robots capable of moving inside a house by themselves in order to do household labor. Self-localization of mobile robots is very important, and many methods have been proposed to accomplish this feature. In order to localize a robot, it is customary to attach an encoder (or odometer) to a driving unit (e.g., a wheel) of the robot or mount a gyroscope onto the robot in order to measure the correct rotational angle of the robot. However, slippage or mechanical drift of a wheel, when a robot is localized, causes error. Although such error may be negligible at first, it may accumulate and cause significant problems.

A Kalman filter algorithm is conventionally used to localize a robot. However, due to the absence of constraints, estimated parameters often violate physical constraints. For example, when the wheel base distance of a mobile robot is $W_b$ and the physical range of $W_b$ is 0.3 m$\leq W_b \leq$0.4 m, the estimated $W_b$ may be outside this range. In the case of SLAM (simultaneous localization and mapping), which uses ceiling vision based on the Kalman filter, the estimated ceiling height z must be in a certain range, e.g., 2.4 m$\leq W_b \leq$2.5 m. However, the estimated z may be outside this range.

A conventional Indirect Kalman filtering method, proposed by Chung et al., uses a combination of an odometry error model (or encoder error model) and a gyroscope angular error model as a process model, and uses the measured angle difference between a gyroscope and an odometer as the measurement model. The indirect Kalman filter is described in detail in "Accurate Mobile Robot Dead-reckoning With a Precision-calibrated Fiber-optic Gyroscope," by H. Chung, L. Ojeda, and J. Borenstein in IEEE Transactions on Robotics and Automation, vol. 17, Issue 1, pp.80-84, February 2001. The state equation of the conventional indirect Kalman filter method includes various parameter estimates, such as error in robot pose estimated by the encoder, error in robot angle estimated by the gyroscope, scale factor of the odometry, and wheel tread distance, as well as the state of various sources of noise, as shown in FIG. 3.

In FIG. 3, state variables labeled 310 refer to error in robot pose estimated by the encoder; state variables labeled 320 refer to error in robot heading angle estimated by the gyroscope; state variables labeled 330 refer to various parameter estimations; and a state variable labeled 340 refers to noise.

In FIG. 3, $S_R(k)$ and $S_L(k)$ refer to the scale factor errors of the right and left encoders, respectively, and D(k) refers to the tread error, i.e., the error introduced by variations in the distance between the left and right wheels.

However, an indirect Kalman filter based on the state equation shown in FIG. 3 has poor observability. Particularly, although the state vector in the state equation of FIG. 3 has a dimension of 9, the rank of the observability matrix is merely 2 under an assumption that the state transition matrix is in a steady state of a time-invariant system.

The fact that the state of the robot is not fully observable makes it impossible to guarantee whether or not remaining states converge. More particularly, since nothing but a rotational angle state is included in the observation matrix, it cannot be confirmed whether or not a state, such as error in position (x, y) of the robot, converges to a true value. Even when the system is in a time-varying condition, the observability matrix has a rank of 6 and is still unstable.

Therefore, in order to solve this problem, the present invention introduces an additional observable system state for estimation.

Therefore, it is also necessary to both reduce error in localizing a robot so that the stability of the robot is guaranteed, and make parameters estimated when applying a Kalman filter satisfy physical constraints so that the performance of the robot is improved.

A measurement equation according to the related art is defined by equation (6) below and shown in FIG. 6. It is clear from FIG. 6 that only an angular state is included in the observation matrix H.

Measurement equation=orientation of robot estimated by encoder−orientation of robot estimated by gyroscope+noise     (6)

Figure 6:
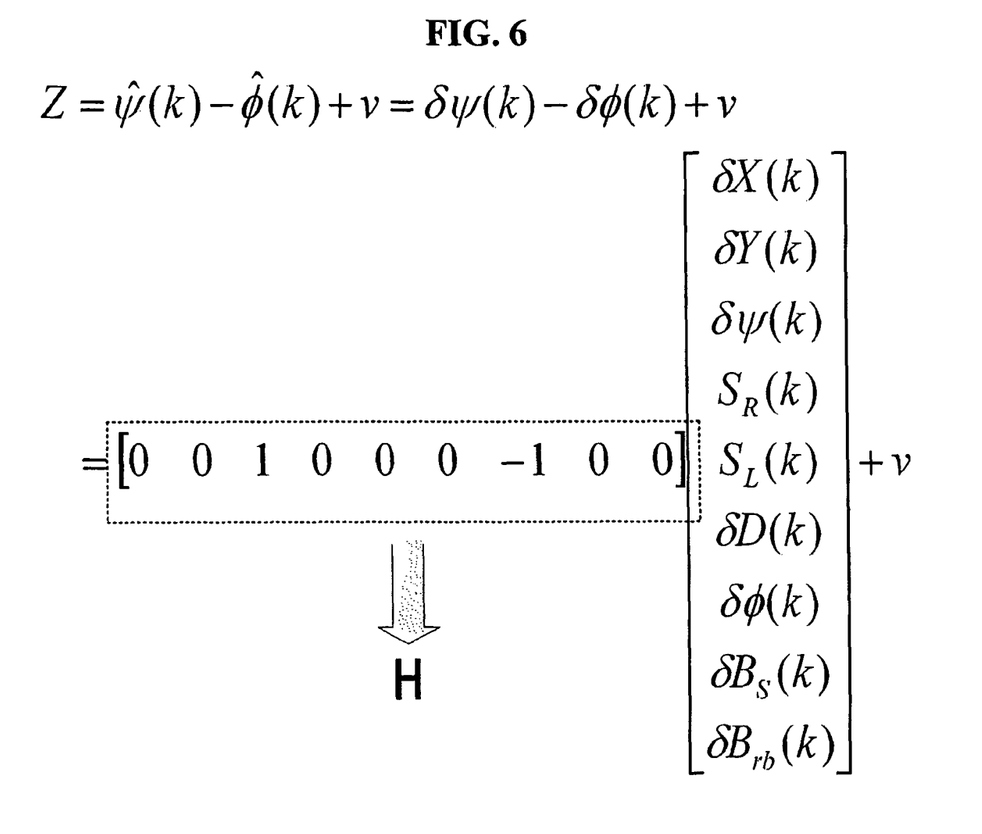
FIG. 6 shows a measurement equation for the example of FIG. 2 according to the related art.

In FIG. 6, "v" refers to measurement noise.

SUMMARY OF THE INVENTION

Accordingly, the present invention has been made to solve the above-mentioned problems occurring in the related art, and an aspect of the present invention is to provide a method of localizing a robot wherein localization error is reduced by adjusting the rank of an observability matrix.

Another aspect of the present invention is to provide a method of localizing a robot wherein a Kalman filter method for parameters having known constraints is applied so that the constraints are satisfied.

Additional aspects and/or advantages of the invention will be set forth in part in the description which follows and, in part, will be apparent from the description, or may be learned by practice of the invention.

The foregoing and/or other aspects are achieved by providing a robot including a gyroscope module providing information regarding a rotational angle of a gyroscope; an encoder module for providing information regarding velocity and information regarding rotational angle of a wheel of the robot by sensing motion of the wheel; and a control module estimating a current pose of the robot according to a method based on information provided by the encoder module and the gyroscope module, the control module incorporating information regarding the rotational angle provided by the gyroscope module when estimating the current pose.

The foregoing and/or other aspects are also achieved by providing a method of localizing a robot having an encoder module and a gyroscope module, the method including: the gyroscope module providing information regarding a rotational angle of a gyroscope; the encoder module providing information regarding velocity and information regarding a rotational angle of a wheel, based on motion of the wheel; and localizing the robot based on the information provided by the encoder module and the gyroscope module by incorporating information regarding the rotational angle provided by the gyroscope module.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 shows a state equation for the example of FIG. 2 according to the related art;

FIG. 4 shows a state equation for the example of FIG. 2 according to the embodiment of the present invention;

DETAILED DESCRIPTION OF THE PREFERRED EMBODIMENT

Reference will now be made in detail to the embodiment of the present invention, an example of which is illustrated in the accompanying drawings, wherein like reference numerals refer to the like elements throughout. The embodiment is described below to explain the present invention by referring to the figures.

The present invention is described hereinafter with reference to flowchart illustrations of a robot and a method of localizing the robot according to the embodiment of the invention. It should be understood that each block of the flowchart illustrations, and combinations of blocks in the flowchart illustrations, can be implemented, for example, by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means of implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operations to be performed in the computer or other programmable apparatus to produce a computer implemented process such that the instructions that execute on the computer or other programmable apparatus provide operations to implement the functions specified in the flowchart block or blocks.

Each block of the flowchart illustrations may represent a module, segment, or portion of code, which includes one or more executable instructions to implement the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 1:
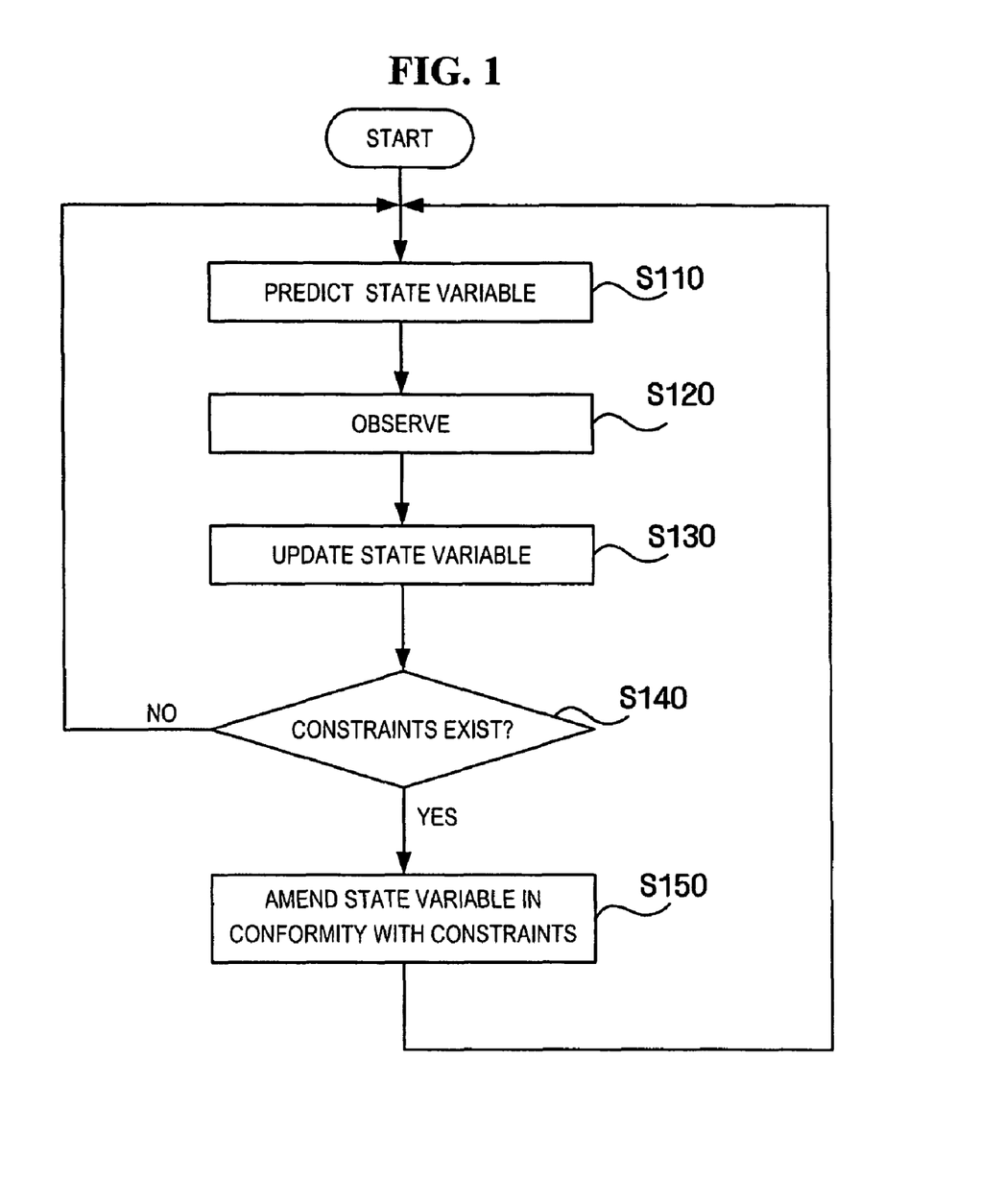
FIG. 1 is a flowchart showing a method of localizing a robot according to an embodiment of the present invention.

FIG. 1 is a flowchart showing a method of localizing a robot according to an embodiment of the present invention.

Referring to FIG. 1, a state variable is initially predicted S110. A new state variable is added to a conventional state equation so that the size of the rank of an observability matrix is improved. This stabilizes the state of the robot localization process.

Figure 2:
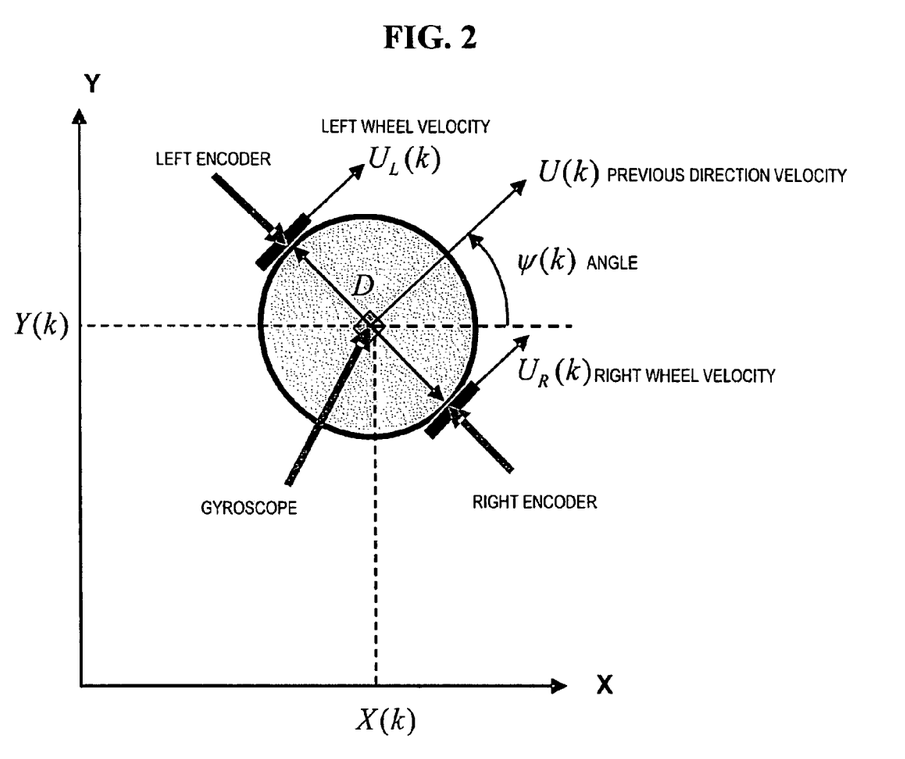
FIG. 2 shows an example of state variables and parameters of a mobile robot according to the embodiment of the present invention.

FIG. 2 shows state variables and parameters of a mobile robot.

The observability matrix for dynamic system model over a discrete-time interval can be defined by equation 1:

$$O(H_k, F_k, 1 \leq k \leq k_f) = \sum_{k=1}^{k_f} \left[\prod_{i=0}^{k-1} F_{k-i}\right]^T H_k^T H_k \left[\prod_{i=0}^{k-1} F_{k-i}\right] \quad (1)$$

where $H_k$ refers to an observation matrix at time k, T is a transpose of the matrix, and $F_k$ refers to a state transition matrix from k to (k+1) for $1 \leq k \leq k_f$.

When the state transition matrix of the dynamic system model is time-invariant, the observability can be characterized by a rank of the matrix defined by equation (2):

$$O = [H^T \, F^T H^T \, (F^T)^2 H^T \ldots (F^T)^{n-1} H^T] \quad (2)$$

The system is observable if the rank of equation (2) is n, which corresponds to the dimension of the system state vector.

As mentioned above, according to the related art, the rank is 2, which means that the robot system is not fully observable.

The embodiment of the present invention uses a gyroscope and encoders for both wheels so that a pose of the robot, in which rotational angle of the gyroscope is incorporated, is observable.

The position and heading angle $\phi(k)$ of the robot can be defined by equation (3):

$$\hat{X}_G(k+1) = \hat{X}_G(k) + \cos\hat{\phi}(k) \times \quad (3)$$
$$\left(\frac{(1+S_R(k))U_R(k) + (1+S_L(k))U_L(k)}{2}\right)$$

-continued $$\hat{Y}_G(k+1) = \hat{Y}_G(k) + \sin\hat{\phi}(k) \times \left(\frac{(1+S_R(k))U_R(k) + (1+S_L(k))U_L(k)}{2}\right)$$

$$\hat{X}_G(k) = X(k) + \delta X_G(k)$$

$$\hat{Y}_G(k) = Y(k) + \delta Y_G(k)$$

where $\hat{X}_G(k)$ and $\hat{Y}_G(k)$ refer to the calculated position using calculated gyro angle, $\delta X_G(k)$ and $\delta Y_G(k)$ refer to errors in position of the robot estimated by the gyroscope, and $\phi$ refers to the rotational angle of the gyroscope.

By adding $\delta X_G(k)$ and $\delta Y_G(k)$ to the state equation shown in FIG. 3 as new state variables, the state equation is modified as shown in FIG. 4, wherein reference numeral 410 indicates newly added state variables, and 420 indicates a newly added portion of the system matrix.

The state equation may be considered as a process model which models a change of the state variable according to the elapse of time.

State estimation based on FIG. 4 is defined by equation (4):

$$\hat{x}_k^- = f(x_{k-1}, U_k, 0)$$

$$P_k^- = F_k P_{k-1} F_k^T + Q_k \qquad (4)$$

where x refers to a state variable in FIG. 4; u refers to a velocity component of the robot; F refers to matrix F in FIG. 4; P refers to a covariance matrix; Q refers to a variance regarding noise; and $F_k = \partial f/\partial x(x_k, u_k, 0)$ Based on a state equation having estimated state variables, as shown in FIG. 4, the state is observed S120.

An observation model such as a measurement equation may be used to this end. A measurement equation according to the embodiment of the present invention is defined by equation 5 below and is illustrated in FIG. 5.

The observation model represents a modeling for a combination of observable state variables Measurement equation=pose of robot estimated by encoder−pose of robot estimated by gyroscope+ noise (5)

Figure 5:
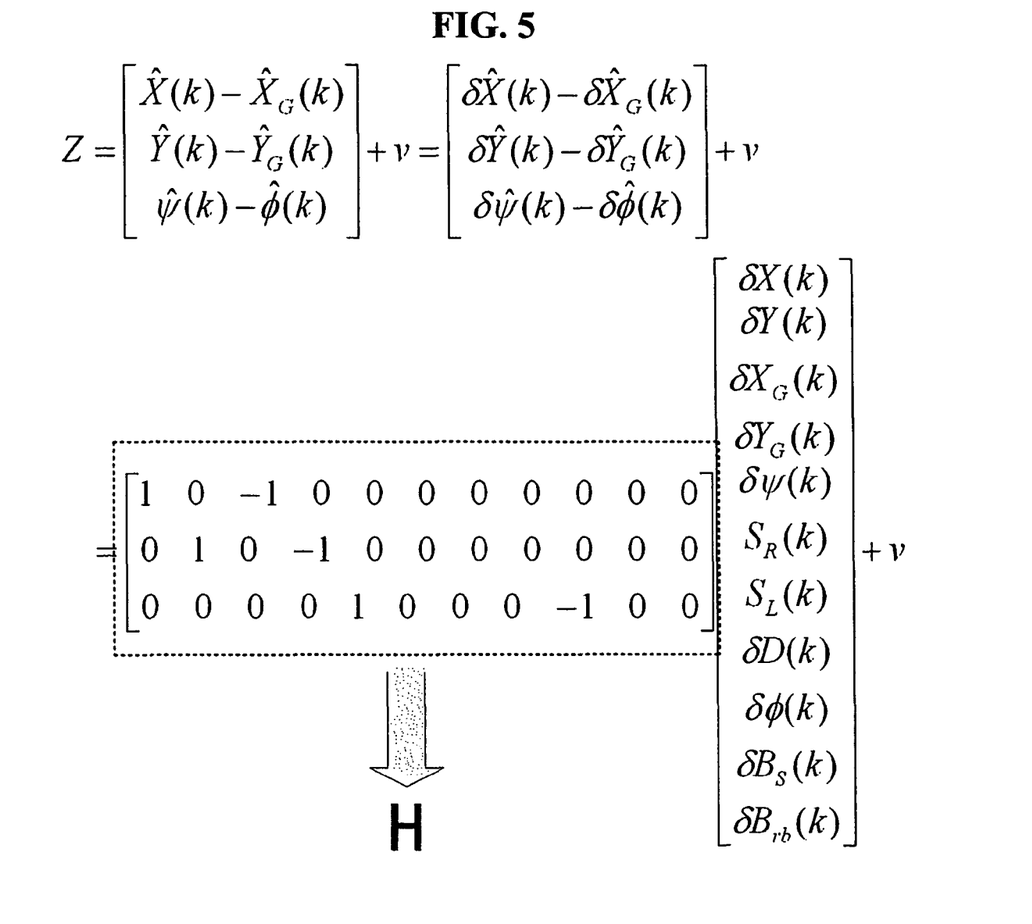
FIG. 5 shows a measurement equation for the example of FIG. 2 according to the embodiment of the present invention.

In FIG. 5, "v" refers to measurement noise.

In contrast to the related art, the observation matrix H of the measurement equation according to the present embodiment, shown in FIG. 5, includes not only an angular state, but also a state related to the position of the robot. As a result, the rank of the observability matrix, as defined by equation (1), is improved.

Particularly, the present rank(O)=4, in the case of a time-invariant system. This satisfies a condition that error in x, y distances converge to a true value. In the case of a time-varying system, rank(O)=10, thereby stabilizing the system. It is to be noted that state variable $\delta B_s(k+1)$ of FIG. 4 corresponds to error in scale factor of the gyroscope. The variable $\delta B_s(k+1)$ is related to the calibration of the gyroscope prior to calculation of rank and is excluded when calculating the rank.

After observing the state of the robot in operation 120 and obtaining $Z_k$ including observation matrix H (in this case, H and $Z_k$ refer to H and Z shown in FIG. 6, respectively), Kalman gain is obtained based on the H. The Kalman gain and $Z_k$ are used to update the state variable x and covariance P in equation (4), as defined by equation 7:

$$K_k = P_k^- H_k^T (H_k P_k^- H_k^T + R_k)^{-1}$$

$$\hat{x}_k = \hat{x}_k^- + K_k(z_k - h(\hat{x}_k^-, 0))$$

$$P_k(I - K_k H_k) P_k^- \qquad (7)$$

Wherein, $K_k$ refers to Kalman gain, I is an identity matrix, $R_k$ refers to variance regarding noise, and $H_k = \partial h/\partial x(x_k, u_k, 0)$ When the mobile robot has no constraints (S140), the state variable $\hat{x}_k$, which was updated in operation S130, is used to localize the mobile robot, and operation S110 is repeated.

When the mobile robot has constraints (S140), the state variable $\hat{x}_k$, which has been updated in operation S130, is amended in conformity with the constraints so that the mobile robot is localized based on the amended state variables (S150).

The constraints of the mobile robot, which has a gyroscope loaded thereon, include wheel tread distance, wheel diameter, as well as scale factor and bias of the gyroscope resulting from temperature and angle rate change. In addition, the constraints may include linear constraints, non-linear constraints, inequality constraints, and equality constraints.

Figure 7:
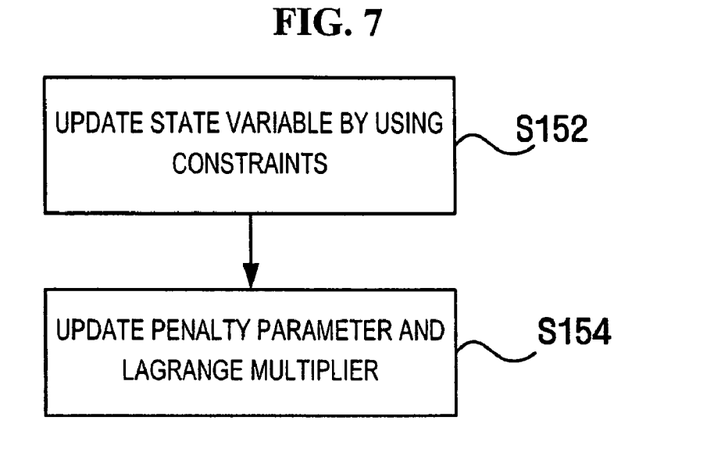
FIG. 7 is a flowchart showing operation S150 of FIG. 1 in more detail according to the embodiment of the present invention.

FIG. 7 is a flowchart showing operation S150 of FIG. 1 in more detail. Operation S150 includes operation S152 of updating state variable $\hat{x}_k$ by using constraints and operation S154 of updating a penalty parameter and a Lagrange multiplier.

Those skilled in the art can understand that the present invention is directed to a Kalman filter problem with constraints. In order to solve this problem, a state variable without constraints is projected onto a constraint plane so that a solution is obtained.

Particularly, with constraints g and h, a solution is obtained from equation (8) below, under a condition of $g_i(x) \leq 0$ and $h_j(x) = 0$.

$$\min_x f(x) = (x - \hat{x})^T W (x - \hat{x}) \qquad (8)$$

Here, $g_i(x)$ refers to inequality constraints; $h_j(x)$ refers to equality constraints; $\hat{x}_k$ refers to a Kalman-filtered state; and W refers to any positive definite matrix, such as identity matrix or process noise covariance matrix.

In the case of a constrained optimization problem, such as equation 8, the necessary condition for the existence of a state, which locally minimizes the constrained optimization problem to be minimized, is a Lagrange multiplier. Conventional Kuhn-Tucker optimality conditions can provide such a condition, for example.

Equation (8) corresponds to a convex problem, and conventional penalty function theorem can be applied to equation 8.

The penalty function theorem states that, when penalty parameter $s_k$ gradually increases in a convex problem, the solution of a Lagrangian function L( ) converges to an optimal solution. The resulting penalty function is defined by equation 9:

$$L(s_k, x) = f(x) + s_k/2[\Sigma_i (g_i^+(x))^2 + \Sigma_j (h_j(x))^2] \qquad (9)$$

where $g_i^+(x) = \max(0, g_i(x))$.

By applying the penalty function theorem to equation 8, a solution of a state variable, which has been updated by using constraints, is defined by equation 10:

$$x_k = -2W^T(x_k - \hat{x}_k) - [\Sigma_i \nabla g_i(s_k g_i^+ + \lambda_i) + \Sigma_j \nabla h_j(s_k h_j + \mu_j)] \qquad (10)$$

Wherein, $\dot{\lambda}_i = \epsilon s_k g_i^+$, $\dot{\mu}_j = \epsilon s_k h_j$, $s_k = (1+\alpha)s_{k-1}$, $\alpha \geqq 0$, $\epsilon \geqq 0$.

In addition, $\hat{x}_k$ refers to a state variable updated in operation S130; $x_k$ refers to a state variable updated by using constraints; g refers to inequality constraints; h refers to equality constraints; s refers to a penalty parameter; and $\lambda$ and $\mu$ refer to Lagrange multipliers.

The penalty parameter s can be selected based on the above-mentioned penalty function theorem.

A process for updating the penalty parameter s and Lagrange multipliers $\lambda$ and $\mu$ will now be described.

Initially, $\epsilon = 0$, $\alpha =$ positive constant, and, after a predetermined time, $\epsilon$ is also modified into a small positive constant, so that s, $\lambda$, $\mu$ are updated. If necessary, $\alpha$ may be modified into another positive constant after a predetermined time, in order to improve the convergence rate.

As defined by equation 10, update of a constrained Kalman filter satisfies both Kuhn-Tucker optimality conditions and penalty function theorem. Thus, the update of the constrained Kalman filter is regarded as an optimal solution.

Particularly, according to the related art, only linear constraints are considered and, in order to obtain a solution, the inverse function of an arbitrary positive definite matrix W must be calculated. In contrast, the embodiment of the present invention can be applied even when the constraints are arbitrary non-linear functions, and no calculation of the inverse function of W is necessary, as defined by equation 10. As such, the embodiment of the present invention provides a substantially improved algorithm over the related art.

Figure 8:
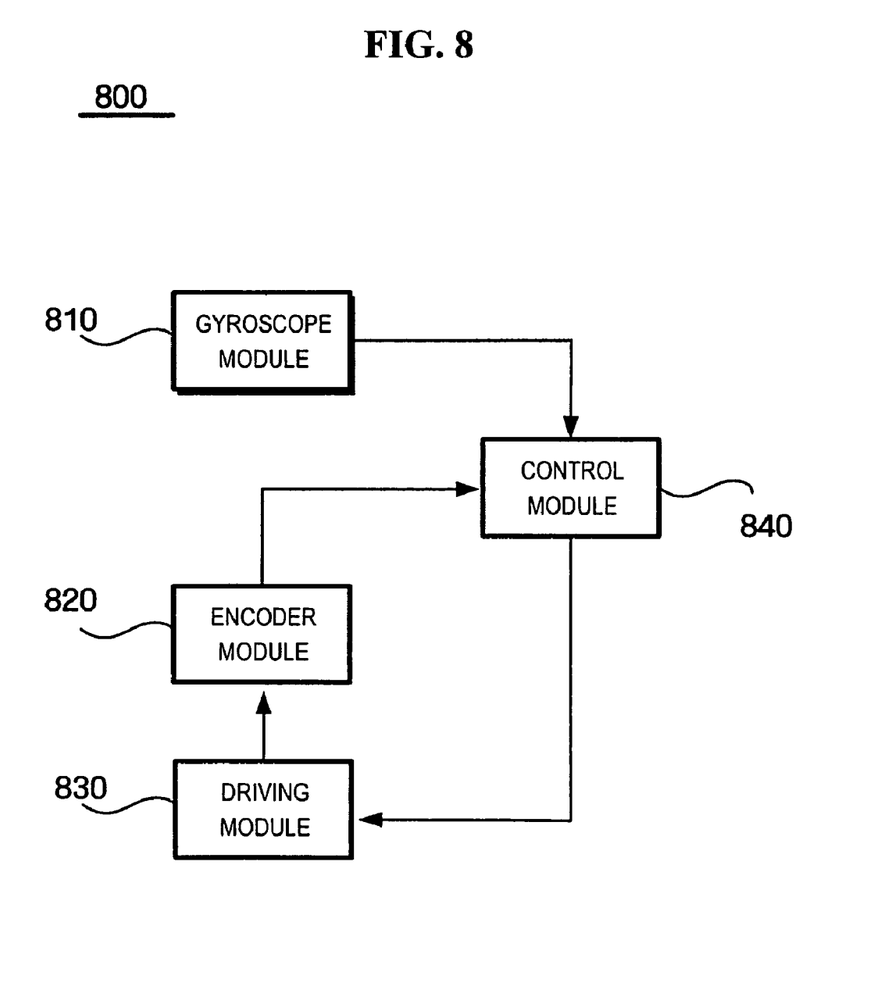
FIG. 8 is a block diagram showing the construction of a robot according to the embodiment of the present invention.

FIG. 8 is a block diagram showing the construction of a robot according to an embodiment of the present invention. The robot 800 includes a gyroscope module 810, an encoder module 820, a driving module 830, and a control module 840.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In addition, "robot", as used herein, refers to an object adapted to localize itself by using a gyroscope and encoders.

The gyroscope module 810 is attached to the mobile robot 800 and provides information regarding the rotational angle of the gyroscope, as labeled $\phi$ in FIG. 4.

The encoder module 820 senses the operation of the driving module 830, which includes wheels, and provides information regarding the velocity ($U_L$, $U_R$ in FIG. 4) of the mobile robot 800 and the rotational angle ($\psi$) in FIG. 4) of the wheels.

The control module 840 localizes the mobile robot 800 based on the information inputted from the encoder module 820 and the gyroscope module 810 by using the above-mentioned Kalman filter method with constraints. By considering the pose information of the mobile robot 800, in which the $\phi$ information is incorporated, the stability of the mobile robot 800 system is improved.

After localizing the mobile robot 800, the control module 840 operates the driving module 830 accordingly so that the mobile robot 800 is moved.

For comparison, experiments have been performed with robot parameters, including a wheel tread diameter D of 0.378 m and a wheel diameter R of 0.122 m, as well as gyroscope parameters, including gyroscope scale factor (rate to angle scale factor) $B_s$ of 0.01, and gyroscope rate bias $B_b$ of 0 (deg/sec).

An example of parameter constraints used in the experiments is defined below.

Figure 9A:
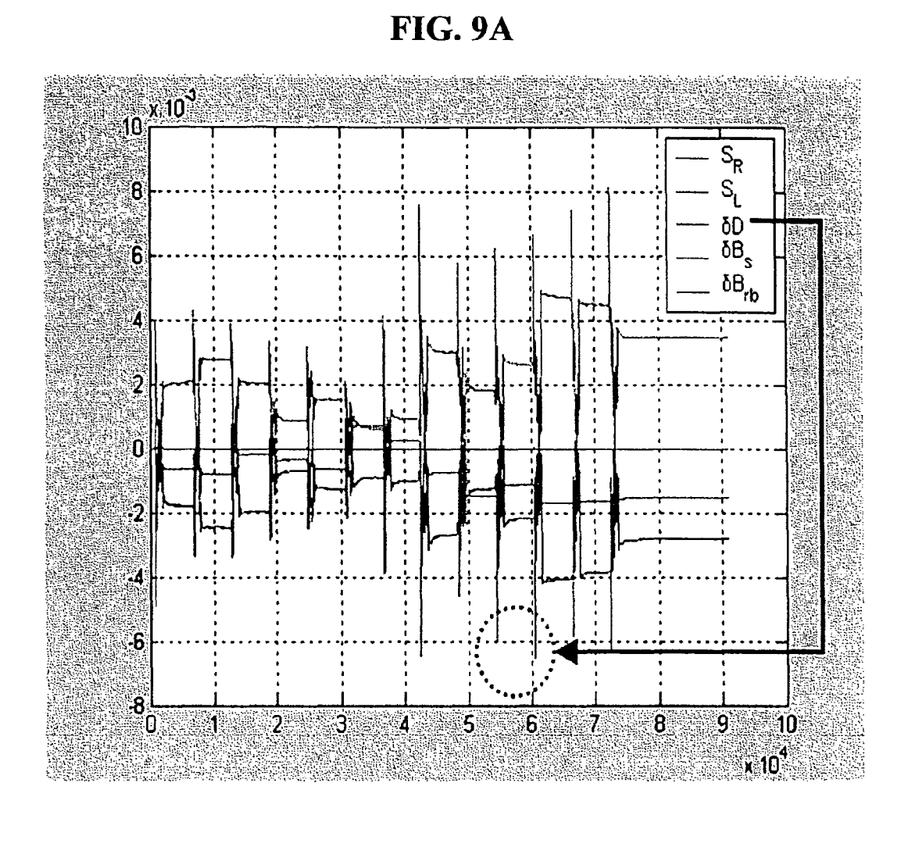
FIG. 9A is a graph showing an experimental result, when constraints are not considered, according to the related art.
Figure 9B:
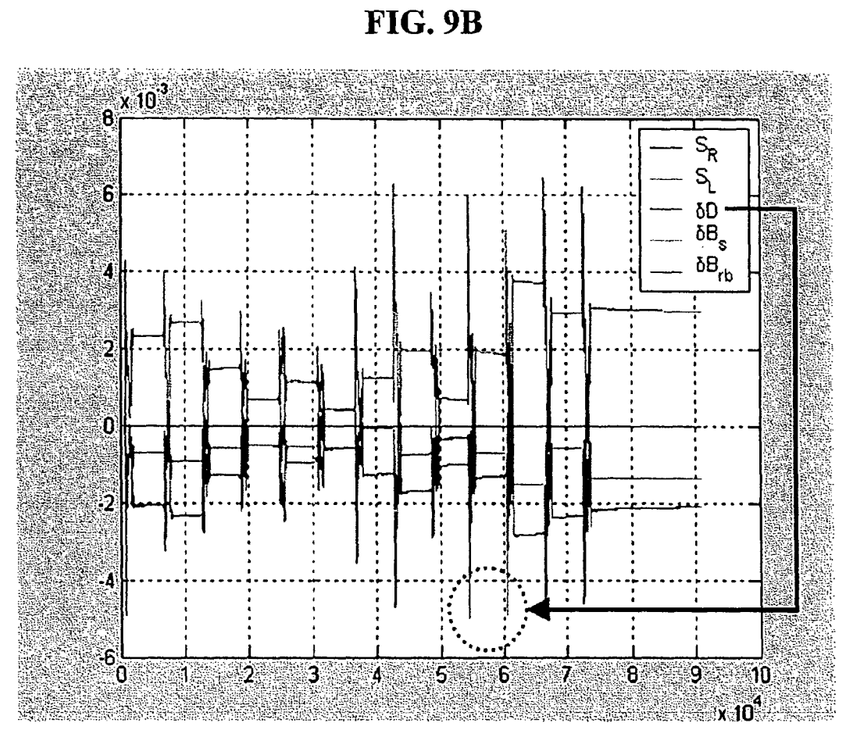
FIG. 9B is a graph showing an experimental result, when constraints are considered, according to the embodiment of the present invention.

$|S_R| \leqq 0.1$ $|S_L| \leqq 0.1$ $|\delta D| \leqq 0.005$ $|\delta B_{rb}| \leqq 0.01$ FIG. 9A is a graph showing an experiment result, when constraints are not considered, according to the related art, and FIG. 9B is a graph showing an experiment result, when constraints are considered, according to the embodiment of the present invention.

It is clear from comparison between FIGS. 9A and 9B that constraints regarding $\delta D$ are not satisfied in FIG. 9A, but are satisfied in FIG. 9B.

Figure 10:
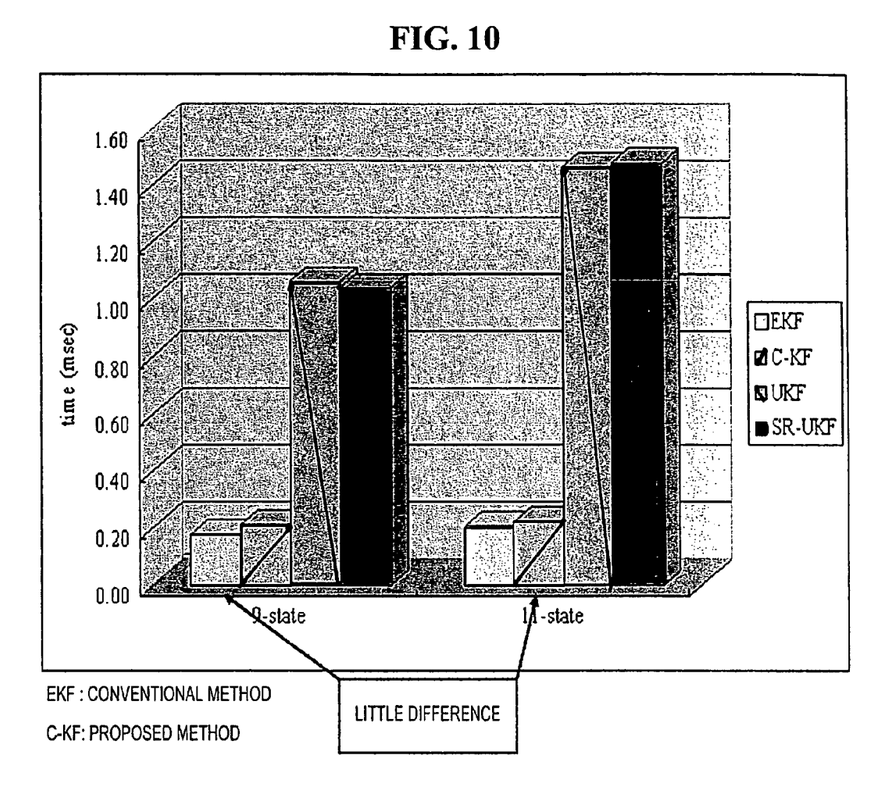
FIG. 10 is a graph showing comparison of mean processing time for 1 cycle of a Kalman filter according to the related art and the present embodiment.

FIG. 10 is a graph showing comparison of mean processing time for 1 cycle of a Kalman filter.

Referring to FIG. 10, bars labeled EKF show mean processing time according to the related art, bars labeled C-KF show mean processing time according to the embodiment of the present invention, bars labeled UKF show mean processing time based on Unscented Kalman Filter method, and bars labeled SR-UKF show mean processing time based on Square-Root Unscented Kalman Filter method.

It is clear that there is little difference between the present mean processing time and that of the related art. Thus, even though the embodiment of the present invention reduces error in locating a robot while satisfying physical constraints, the processing time is not increased.

Although a Kalman filter with constraints is used to locate a robot in the embodiment of the present invention, it is only an example and does limit the present invention in any manner.

As mentioned above, the present invention can improve the rank of an observability matrix and guarantee the stability of a robot. In addition, a Kalman filter is used so that conventional non-linear constraints are satisfied. This improves the system stability. Furthermore, K-T optimality conditions are satisfied in the case of update for satisfying constraints. This design provides an optimal solution in the current state.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:
1. A robot comprising:
  a gyroscope module providing information regarding a rotational angle of a gyroscope;
  an encoder module providing information regarding velocity and information regarding rotational angle of a wheel of the robot by sensing motion of the wheel; and
  a control module estimating a current pose of the robot based on information provided by the encoder module and the gyroscope module by applying a Kalman filter with physical constraints, the control module incorpo- rating the information regarding the rotational angle provided by the gyroscope module when estimating the current pose,
wherein the control module is adapted to localize the robot by using the estimated pose of the robot and a pose error of the robot estimated by the gyroscope module as state variables.

2. The robot of claim 1, wherein the Kalman filter satisfies Kuhn-Tucker optimality conditions and penalty function theorem.

3. The robot of claim 1, wherein the physical constraints are expressed as penalty functions.

4. A method of localizing a robot having an encoder module and a gyroscope module, comprising:
providing information regarding a rotational angle of a gyroscope from the gyroscope module;
providing information regarding velocity and information regarding a rotational angle of a wheel of the robot, based on motion of the wheel, from the encoder module; and
localizing the robot based on the information provided from the encoder module and the gyroscope module by incorporating information regarding the rotational angle provided by the gyroscope module by applying a Kalman filter with physical constraints,
wherein the localizing the robot is performed by using an estimated pose of the robot and a pose error of the robot estimated by the gyroscope module as state variables.

5. The method of claim 4, wherein the localizing the robot comprises:
predicting a state variable by a process model of localizing the robot;
observing an observation model by a measurement equation; and
updating the predicted state variable.

6. The method of claim 5, wherein the process model is expressed by a state equation:

7. The method of claim 5, wherein the measurement equation=the estimated pose of the robot−the pose of the robot estimated by the gyroscope+noise.

8. The method of claim 7, wherein the measurement equation is defined by:

$$Z = \begin{bmatrix} \hat{X}(k) - \hat{X}_G(k) \\ \hat{Y}(k) - \hat{Y}_G(k) \\ \hat{\psi}(k) - \hat{\phi}(k) \end{bmatrix} + v$$

$$= \begin{bmatrix} \delta\hat{X}(k) - \delta\hat{X}_G(k) \\ \delta\hat{Y}(k) - \delta\hat{Y}_G(k) \\ \delta\hat{\psi}(k) - \delta\hat{\phi}(k) \end{bmatrix} + v$$

$$= \begin{bmatrix} 1 & 0 & -1 & 0 & 0 & 0 & 0 & 0 & 0 & 0 \\ 0 & 1 & 0 & -1 & 0 & 0 & 0 & 0 & 0 & 0 \\ 0 & 0 & 0 & 0 & 1 & 0 & 0 & -1 & 0 & 0 \end{bmatrix} \begin{bmatrix} \delta X(k) \\ \delta Y(k) \\ \delta X_G(k) \\ \delta Y_G(k) \\ \delta\psi(k) \\ S_R(k) \\ S_L(k) \\ \delta D(k) \\ \delta\phi(k) \\ \delta B_S(k) \\ \delta B_{rb}(k) \end{bmatrix} + v$$

wherein $\hat{X}_G(k)$ and $\hat{Y}_G(k)$ indicate a position of the robot estimated by using rotational angle provided by the gyroscope module and v is measurement noise.

9. The method of claim 5, wherein, the updating comprises updating the predicted state variable by $$K_k = P_k^- H_k^T (H_k P_k^- H_k^T + R_k)^{-1}$$

$$\hat{x}_k = \hat{x}_k^- + K_k(z_k - h(\hat{x}_k^-, 0))$$

$$P_k = (I - K_k H_k) P_k^-$$

$$\begin{bmatrix} \delta X(k+1) \\ \delta Y(k+1) \\ \delta X_G(k+1) \\ \delta Y_G(k+1) \\ \delta\psi(k+1) \\ S_R(k+1) \\ S_L(k+1) \\ \delta D(k+1) \\ \delta\phi(k+1) \\ \delta B_S(k+1) \\ \delta B_{rb}(k+1) \end{bmatrix} = \begin{bmatrix} 1 & 0 & 0 & 0 & -\sin\psi(k)\frac{U_R+U_L}{2} & \cos\psi(k)\frac{U_R}{2} & \cos\psi(k)\frac{U_L}{2} & 0 & 0 & 0 & 0 \\ 0 & 1 & 0 & 0 & \cos\psi(k)\frac{U_R+U_L}{2} & \sin\psi(k)\frac{U_R}{2} & \sin\psi(k)\frac{U_L}{2} & 0 & 0 & 0 & 0 \\ 0 & 0 & 1 & 0 & -\sin\phi(k)\frac{U_R+U_L}{2} & \cos\phi(k)\frac{U_R}{2} & \cos\phi(k)\frac{U_L}{2} & 0 & 0 & 0 & 0 \\ 0 & 0 & 0 & 1 & \cos\phi(k)\frac{U_R+U_L}{2} & \sin\phi(k)\frac{U_R}{2} & \sin\phi(k)\frac{U_L}{2} & 0 & 0 & 0 & 0 \\ 0 & 0 & 0 & 0 & 1 & \frac{U_R}{D} & \frac{U_L}{D} & \frac{U_L-U_R}{D^2} & 0 & 0 & 0 \\ 0 & 0 & 0 & 0 & 0 & 1 & 0 & 0 & 0 & 0 & 0 \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & \Omega & 1 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{bmatrix} \begin{bmatrix} \delta X(k) \\ \delta Y(k) \\ \delta X_G(k) \\ \delta Y_G(k) \\ \delta\psi(k) \\ S_R(k) \\ S_L(k) \\ \delta D(k) \\ \delta\phi(k) \\ \delta B_S(k) \\ \delta B_{rb}(k) \end{bmatrix} + w,$$

where $\delta X_G(k)$ and $\delta Y_G(k)$ indicate position error of the robot estimated by the gyroscope module, and $\phi$ indicates a rotational angle provided by the gyroscope module, $S_R(k)$ and $S_L(k)$ refer to scale factor errors of the encoder module, D(k) refers to a tread error, $\delta Bs$ is an error in scale factor of the gyroscope, U is a velocity of the wheel, w is process noise and $\psi$ is a rotational angle of the wheel.

where $K_k$ is Kalman gain, $H_k$ is an observation matrix, T is a transpose of the matrix, I is an identity matrix, $P_k$ is a covariance matrix, $R_k$ is variance regarding noise, $\hat{x}_k^-$ is a state variable before update, $\hat{x}_k$ is a state variable after update, $z_k$ is a measurement equation, h refers to inequality constraints, and $H_k = \partial h/\partial x(x_k, u_k, 0)$.

10. The method of claim 4, wherein the Kalman filter satisfies Kuhn-Tucker optimality conditions and penalty function theorem.

11. The method of claim 4, wherein the physical constraints are expressed as penalty functions.

12. The method of claim 4, wherein, based on the Kalman filter having physical constraints, a state equation of the robot is defined by:

$$\dot{x}_k = -2W^T(x_k - \hat{x}_k) - \left[\sum_i \nabla g_i(s_k g_i^+ + '\lambda_i) + \sum_j \nabla h_j(s_k h_j + \mu_j)\right]$$

where $x_k$ is a state variable for localizing the robot, T is a transpose of the matrix, W is a positive definite matrix, $\hat{x}$ is a Kalman-filtered state variable, $g_i(x)$ indicates inequality constraints, $h_j(x)$ indicates equality constraints, "s" is a penalty parameter, $\lambda$ and $\mu$ are Lagrange multipliers, and $\hat{\lambda}_i \epsilon s_k g_i^+$, $\hat{\mu}_j = \epsilon s_k h_j$, $s_k = (1+\alpha)s_{k-1}$, $\alpha \geqq 0$, $\epsilon \geqq 0$.

13. The method of claim 12, wherein initially $\epsilon = 0$, $\alpha =$ positive constant the method further comprising modifying $\epsilon$ into a small positive constant after a predetermined time so that s, $\lambda$, and $\mu$ are updated.

14. The method of claim 13, the method further comprising modifying $\alpha$ into a different positive constant after a predetermined time.

15. The method of claim 6, wherein a rank of an observability matrix is 4 for a time invariant system.

* * * * *

UNITED STATES PATENT AND TRADEMARK OFFICE
CERTIFICATE OF CORRECTION

PATENT NO. : 7,826,926 B2
APPLICATION NO. : 11/593592
DATED : November 2, 2010
INVENTOR(S) : Hyeon Myeong et al.

Page 1 of 1

It is certified that error appears in the above-identified patent and that said Letters Patent is hereby corrected as shown below:

Column 12, Line 1 in Claim 12, delete "$g_{i,}(x)$" and insert -- $g_i(x)$ --, therefor.

Column 12, Line 3 in Claim 12, delete "$\dot{\lambda}_i \in s_k g_i^+,$" and insert -- $\dot{\lambda}_i = \in s_k g_i^+,$ --, therefor.

Signed and Sealed this
Twenty-fifth Day of January, 2011

David J. Kappos
Director of the United States Patent and Trademark Office